US010953336B2

(12) United States Patent
Zhang

(10) Patent No.: US 10,953,336 B2
(45) Date of Patent: Mar. 23, 2021

(54) ROLE SIMULATION METHOD AND TERMINAL APPARATUS IN VR SCENE

(71) Applicant: Tencent Technology (Shenzhen) Company Limited, Shenzhen (CN)

(72) Inventor: Hongyi Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/657,237

(22) Filed: Oct. 18, 2019

(65) Prior Publication Data

US 2020/0047074 A1 Feb. 13, 2020

Related U.S. Application Data

(63) Continuation of application No. PCT/CN2017/111519, filed on Nov. 17, 2017.

(51) Int. Cl.
*A63F 13/215* (2014.01)
*A63F 13/285* (2014.01)
(Continued)

(52) U.S. Cl.
CPC .......... *A63F 13/814* (2014.09); *A63F 13/215* (2014.09); *A63F 13/285* (2014.09); *A63F 13/52* (2014.09); *A63F 13/54* (2014.09); *G06F 3/017* (2013.01); *G10H 1/368* (2013.01); *A63F 2300/1081* (2013.01); *A63F 2300/302* (2013.01); *A63F 2300/6081* (2013.01);
(Continued)

(58) Field of Classification Search
None
See application file for complete search history.

(56) References Cited

U.S. PATENT DOCUMENTS 10,228,760 B1 * 3/2019 Ross ................... A63F 13/5255
2009/0258700 A1 * 10/2009 Bright ................... A63F 13/814
463/31
(Continued)

FOREIGN PATENT DOCUMENTS

CN 101414322 A 4/2009
CN 103050114 A 4/2013
(Continued)

OTHER PUBLICATIONS

Tencent Technology, ISR, PCT/CN2017/111519, Jun. 28, 2018, 3pgs.
(Continued)

*Primary Examiner* — Damon J Pierce
(74) *Attorney, Agent, or Firm* — Morgan, Lewis & Bockius LLP

(57) ABSTRACT

A role simulation method and a terminal apparatus in a VR scene are provided. The role simulation method in the VR scene includes: obtaining a role obtaining instruction triggered by a hand model in the VR scene, movement of the hand model in the VR scene being controlled by an interaction controller; determining a virtual role from the VR scene according to the role obtaining instruction; dynamically adjusting virtual props in the VR scene according to a music file played in the VR scene; displaying the virtual role in the VR scene through a VR display, and displaying the virtual props that are dynamically adjusted.

20 Claims, 9 Drawing Sheets

(51) Int. Cl.
  *A63F 13/814* (2014.01)
  *G06F 3/01* (2006.01)
  *A63F 13/52* (2014.01)
  *A63F 13/54* (2014.01)
  *G10H 1/36* (2006.01)

(52) U.S. Cl.
  CPC ............... *A63F 2300/8047* (2013.01); *G10H 2210/005* (2013.01)

(56) References Cited

U.S. PATENT DOCUMENTS

2017/0144304 A1   5/2017  Guerin et al.
2017/0182414 A1*  6/2017  Oishi .................... A63F 13/219

FOREIGN PATENT DOCUMENTS

| CN | 103093665 A | 5/2013 |
|---|---|---|
| CN | 202929567 U | 5/2013 |
| CN | 104102146 A | 10/2014 |
| CN | 105425955 A | 3/2016 |
| CN | 106095235 A | 11/2016 |
| CN | 106604014 A | 4/2017 |
| CN | 106681479 A | 5/2017 |
| CN | 107103801 A | 8/2017 |
| JP | 2002006871 A | 1/2002 |
| JP | 2009011489 A | 1/2009 |
| JP | 4229318 B2 | 2/2009 |
| JP | 2013231951 A | 11/2013 |
| JP | 2015153442 A | 8/2015 |
| JP | 2015210344 A | 11/2015 |
| JP | 2017055998 A | 3/2017 |
| JP | 2017176728 A | 10/2017 |
| WO | WO 2017/043400 A1 | 3/2017 |

OTHER PUBLICATIONS

Tencent Technology, WO, PCT/CN2017/111519, Jun. 28, 2018, 3 pgs.
Tencent Technology, IPRP, PCT/CN2017/111519, May 19, 2020, 4 pgs.

\* cited by examiner

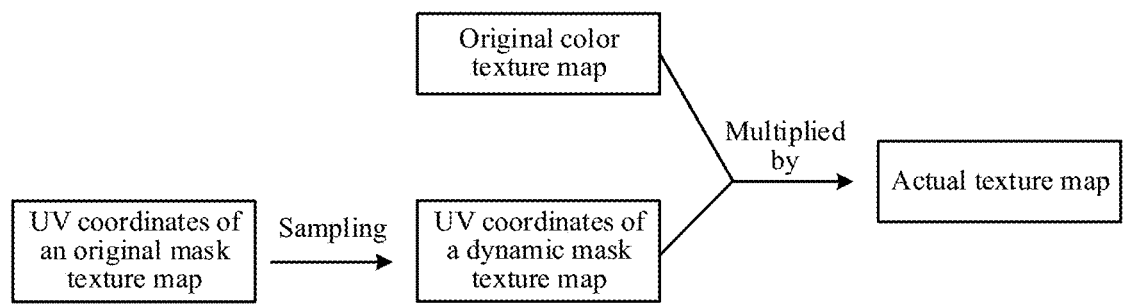
FIG. 6
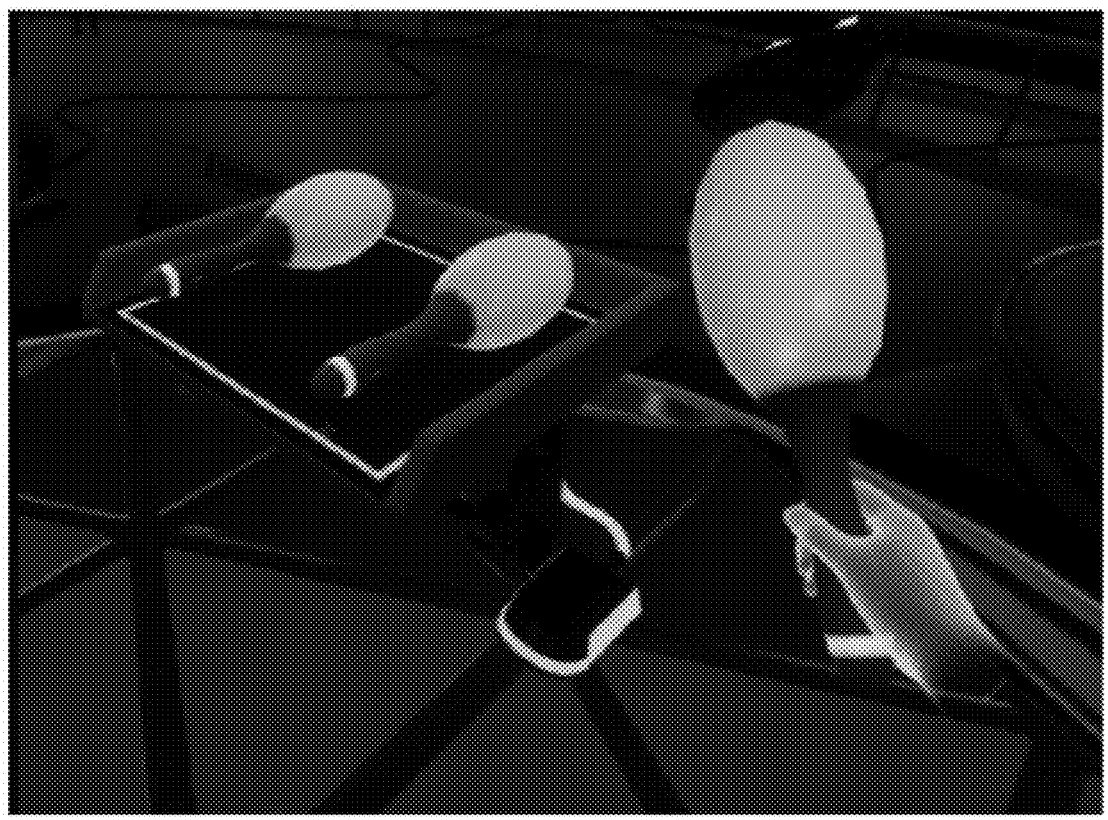
FIG. 7-a

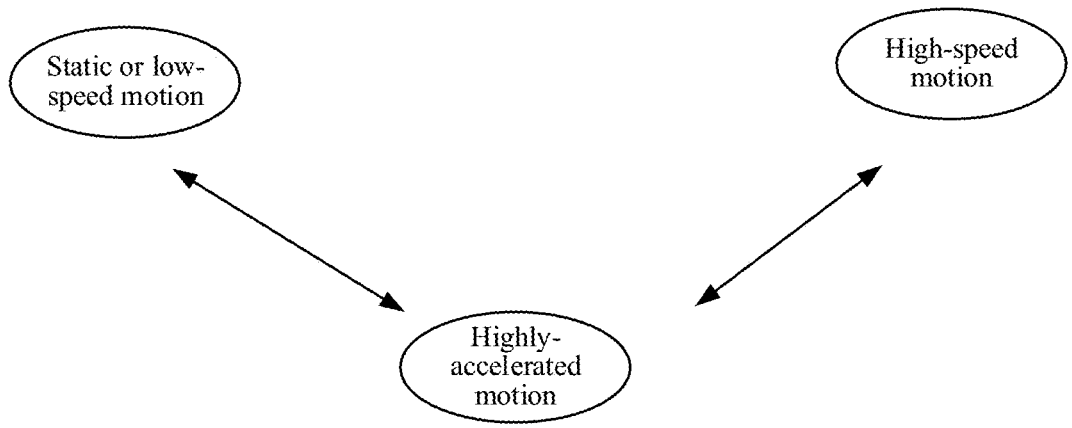
FIG. 7-b
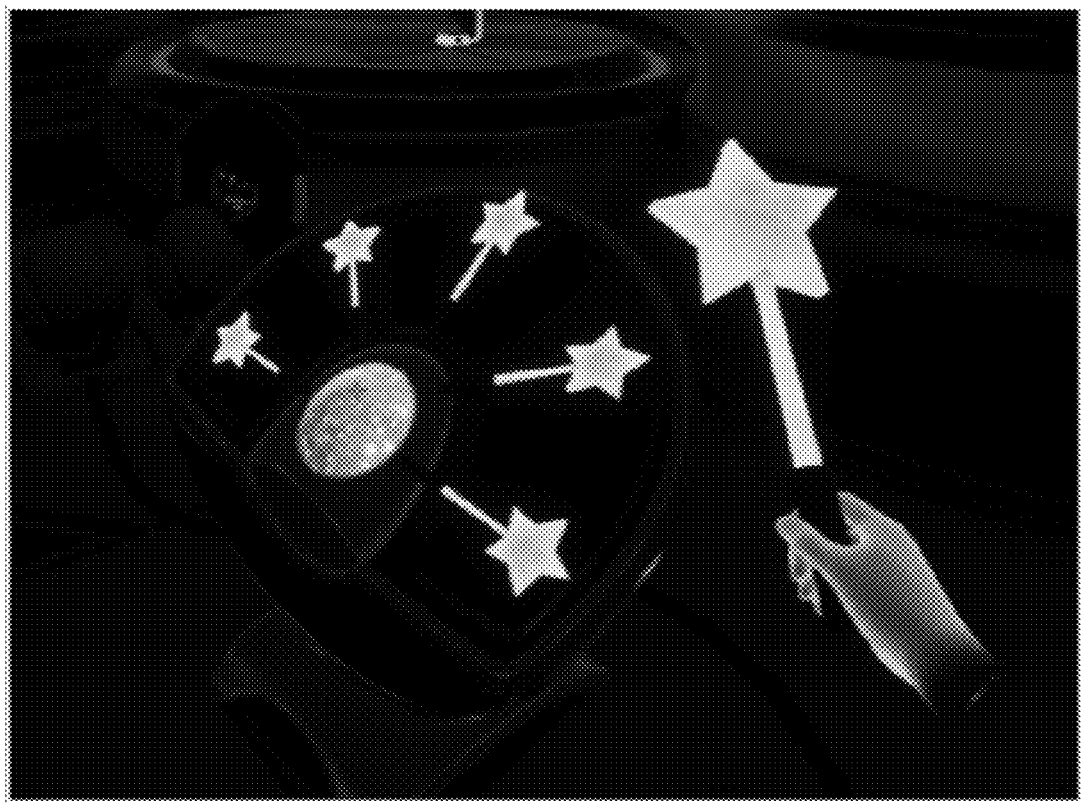
FIG. 8-a

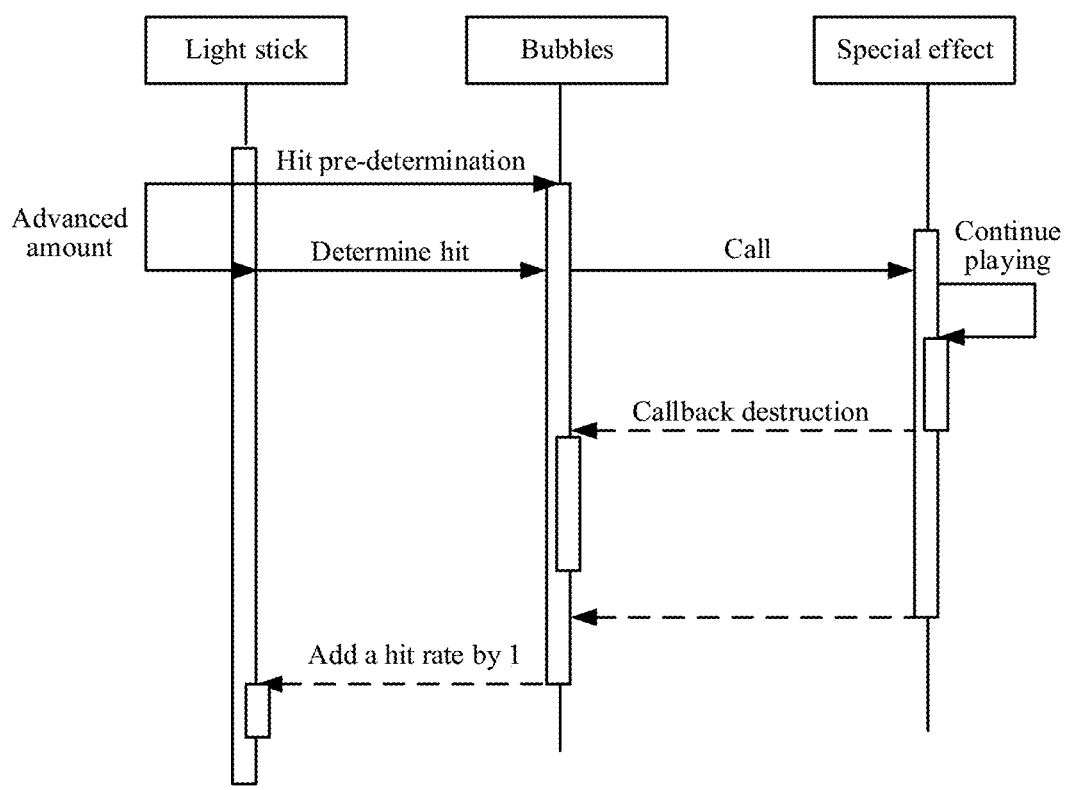
FIG. 8-b

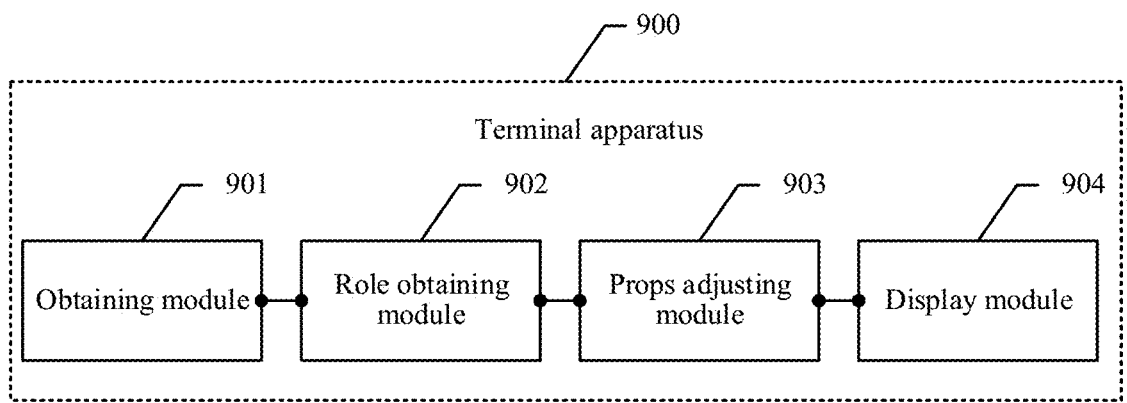
FIG. 9-a
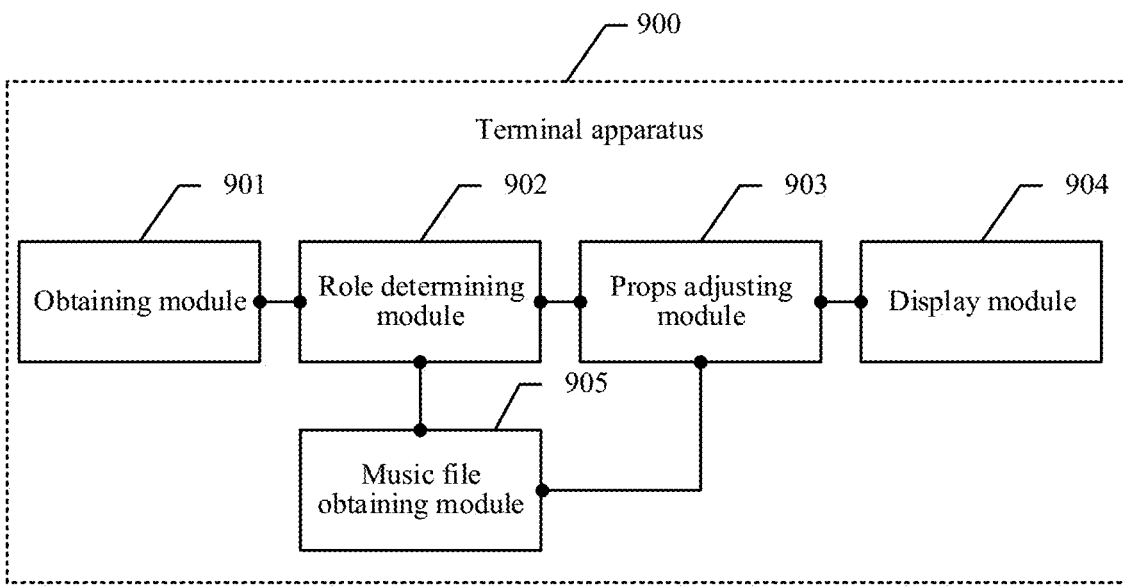
FIG. 9-b

ROLE SIMULATION METHOD AND TERMINAL APPARATUS IN VR SCENE

CROSS-REFERENCE TO RELATED APPLICATION

This application is a continuation application of PCT/CN2017/111519, entitled "METHOD FOR ROLE-PLAY SIMULATION IN VR SCENARIO, AND TERMINAL DEVICE", filed on Nov. 17, 2017, which is incorporated by reference in its entirety.

FIELD OF THE TECHNOLOGY

Embodiments of the present application relate to the field of communications, and in particular, to a role simulation method and a terminal apparatus in virtual reality (VR).

BACKGROUND OF THE DISCLOSURE

At present, a jukebox is widely used, and a video on demand (VOD) system of the jukebox can support a player to select a song to sing from a song database, which can achieve simple interaction between the player and the VOD system. However, such VOD system at present is mainly a standalone version. Therefore, each player can only entertain themselves, and can only sing a song facing a machine like "whistle jigs to a milestone" without an immersive experience.

Karaoke has become one of the most basic social experiences of people. Relatives and friends always get together in a private room of an entertainment venue like a home party or KTV. However, because of limitation by a geographical location, two persons who are far apart cannot experience a feeling in a real KTV.

It can be seen from the foregoing analysis that a traditional juke box and karaoke cannot provide the player with a very good singing experience and cannot provide the player with an immersive role experience.

SUMMARY

Embodiments of the present application provide a role simulation method and a terminal apparatus in a VR scene, which can implement role simulation in the VR scene and bring an immersive role experience to a player.

In a first aspect, an embodiment of the present application provides a role simulation method in the VR scene performed at a terminal apparatus having one or more processors and memory storing programs to be executed by the one or more processors, the method comprising:

obtaining a role obtaining instruction triggered by a hand model in the VR scene, movement of the hand model in the VR scene being controlled by an interaction controller;

determining a virtual role from the VR scene according to the role obtaining instruction;

dynamically adjusting virtual props in the VR scene according to a music file played in the VR scene; and displaying the virtual role in the VR scene through a VR display, and displaying the virtual props that are dynamically adjusted.

In a second aspect, an embodiment of the present application provides a terminal apparatus comprising one or more processors, memory coupled to the one or more processors and a plurality of programs for role simulation in a virtual reality (VR) scene stored in the memory that, when executed by the one or more processors, cause the mobile terminal to perform the aforementioned role simulation method in the VR scene.

In a third aspect, an embodiment of the present application further provides a non-transitory computer readable storage medium storing a plurality of machine readable instructions for role simulation in a virtual reality (VR) scene in connection with a terminal apparatus having one or more processors. The plurality of machine readable instructions, when executed by the one or more processors, cause the terminal apparatus to perform the aforementioned role simulation method in the VR scene.

It can be seen from the foregoing technical solutions, the embodiments of the present application have the following advantages.

In the embodiments of the present application, a role obtaining instruction triggered by a hand model in a VR scene is first obtained, movement of the hand model in the VR scene being controlled by an interaction controller. Afterwards, a virtual role is determined from the VR scene according to the role obtaining instruction. Next, virtual props in the VR scene are dynamically adjusted according to a music file played in the VR scene. Finally, the virtual role in the VR scene is displayed through a VR display, and the virtual props that are dynamically adjusted are displayed. In the embodiments of the present application, the virtual props in the VR scene are dynamically adjusted according to the music file played in the VR scene, so that the virtual props in the VR scene can be dynamically adjusted. When hearing the music file played in the VR scene, the player observes dynamic adjustment of the virtual props with the music file through eyes, so that role simulation in the VR scene can be implemented, bringing an immersive role experience to the player.

BRIEF DESCRIPTION OF THE DRAWINGS

FIG. 6 is a process flowchart of a dynamic mask according to an embodiment of the present application;

FIG. 7-a is a schematic diagram of an implementation scene of interactive props as sand hammers according to an embodiment of the present application;

FIG. 7-b is a schematic diagram of a switching process between a plurality of states of a sand hammer according to an embodiment of the present application;

FIG. 8-a is a schematic diagram of an implementation scene of interactive props as a light stick according to an embodiment of the present application;

FIG. 8-b is a process flowchart of processing a collision between a light stick and a bubble according to an embodiment of the present application;

FIG. 9-*a* is a schematic structural diagram of a terminal apparatus according to an embodiment of the present application;

FIG. 9-*b* is a schematic structural diagram of another terminal apparatus according to an embodiment of the present application;

DESCRIPTION OF EMBODIMENTS

Embodiments of the present application provide a role simulation method and a terminal apparatus in a VR scene, which can implement role simulation in the VR scene and bring an immersive role experience to a player.

Embodiments of the present application are described below with reference to the accompanying drawings.

In the specification, claims, and the foregoing accompanying drawings of the present disclosure, the terms "first", "second", and so on are intended to distinguish between similar objects rather than indicating a specific order. It should be understood that the terms used in this way are interchangeable in an appropriate case, and this is merely a differentiation manner used when objects having a same attribute are described in the embodiments of the present application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

The virtual reality (VR) technology is a computer simulation system that may create and experience a virtual world, which generates a simulation environment using a computer and is system simulation of an interactive 3D dynamic scene and entity behavior of multi-source information fusion, so that a user can be immersed into the environment. The current VR technology is mainly applied to a VR game. However, in the embodiments of the present application, role simulation may be implemented based on a VR scene, so that the player may use a hand model to perform role control in the VR scene, thereby representing the player through a virtual role to experience. A role and virtual props may further be displayed in the VR scene. Such virtual props may be dynamically adjusted according to a music file played in the VR scene. Through the VR experience and an operating mode, the player is endowed with great freedom and has incomparably strong sense of immersion compared to a conventional KTV system. In the prior art, it is very difficult for two persons who are far apart to experience a feeling in a real KTV together. The role simulation solutions in the VR scene provided in the embodiments of the present application may help the user see a virtual scene with two eyes and may also provide a virtual karaoke experience.

Figure 1:
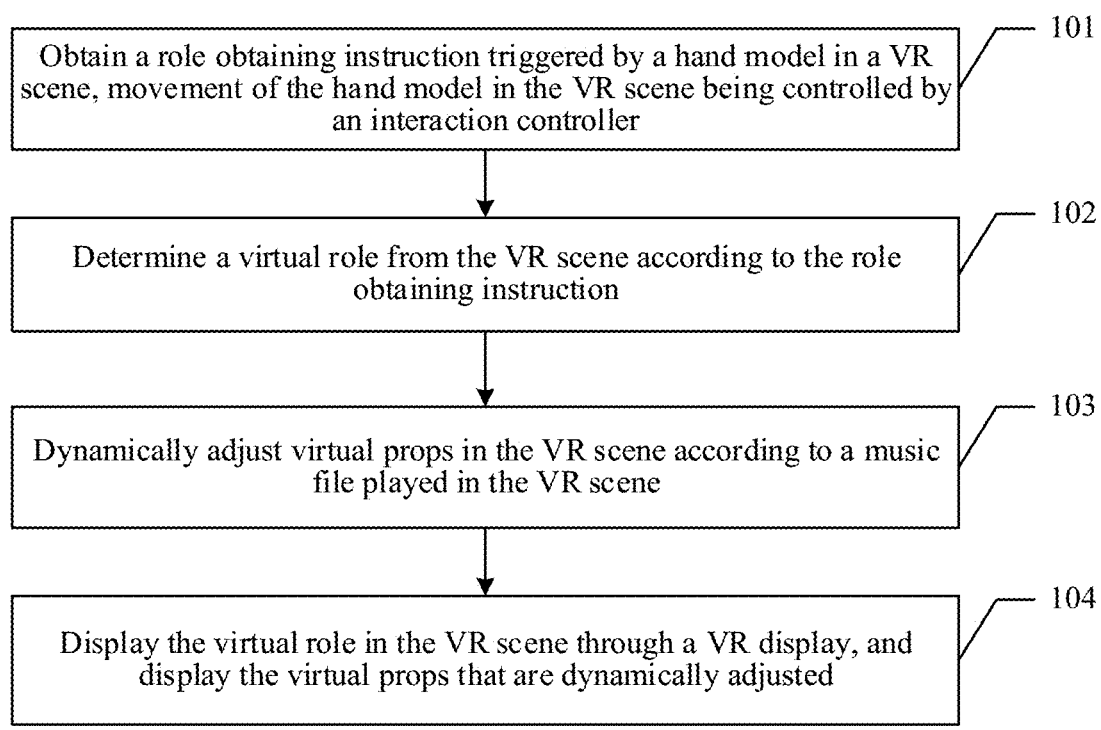
FIG. 1 is a block flowchart of a role simulation method in a VR scene according to an embodiment of the present application.

One embodiment of a role simulation method in the VR scene of the present application may be specifically applied to a scene in which the hand model is used to experience a real feeling of using an interaction controller by the user in the VR scene. The VR scene in the embodiments of the present application may specifically refer to a VR game scene, or may refer to a VR operating scene of an application program, for example, a VR application operating scene for office software, and a VR application operating scene for a role, etc. Referring to FIG. 1, a role simulation method in a VR scene provided in one embodiment of the present application may include the following steps.

101. A role obtaining instruction triggered by a hand model in the VR scene is obtained, movement of the hand model in the VR scene being controlled by an interaction controller.

In this embodiment of the present application, the interaction controller is a control apparatus produced by a VR apparatus manufacturer. For example, a user may use left and right hands to each hold one interaction controller. The interaction controller is a hand control apparatus matched with the VR apparatus, which can track positions, rotation, and input of both hands, and transform hand movement in a real space into a motion of a hand model in VR to use obtained related data in the VR scene. A location of the interaction controller may be obtained through real-time statistic of measured data in a measurement space. The measurement space is a real physical space calibrated by a positioning system produced by a VR hardware apparatus manufacturer, which is generally several square meters to tens of square meters. The measurement space is used to obtain rotation and movement of the interaction controller in the real physical space. For example, the interaction controller may be an operating handle frequently used in a VR game, such as Oculus Touch.

In the embodiment of the present application, the interaction controller may be held by the user for operation, and the user may hold the interaction controller to issue a control instruction. For example, the user operates the interaction controller and controls, through the interaction controller, the hand model to trigger the role obtaining instruction in the VR scene. Before he VR scene is displayed, the player may select a role. In the embodiment of the present application, a plurality of different virtual roles may be set in the VR scene, and each player may control one or more virtual roles. Each player may select a corresponding role of the player through a respective interaction controller after entering a room with the VR scene. In other words, each player uses the interaction controller to control the hand model to trigger a role selection instruction. In different VR scenes, a role category and a role model that need to be set are different. For example, in a VR scene that is a role simulation scene of a vocal concert, an audience role and a singer role (such as a star role) may be set. For another example, in a VR scene that is a role simulation scene of a game battle, roles of a plurality of battle teams may be set, including a friend team and an enemy team, etc.

It should be noted that in the embodiment of the present application, the interaction controller is held by the user to control the instruction to be triggered, the instruction of the interaction controller is triggered to control the hand model to perform a movement operation in the VR scene, and movement of the interaction control may be controlled by the user. In addition, in the embodiment of the present application, the hand model may belong to a part of a virtual role, or may be independent of the virtual role. Movement of the hand model in the VR scene is used to simulate a triggering operation performed by the interaction controller. The hand model may be first displayed as modeling of a hand in the VR scene, or may be game props replacing the hand to perform triggering, such as a glove or a finger, etc.

102. A virtual role is determined from the VR scene according to the role obtaining instruction.

In the embodiment of the present application, the player operates the interaction controller. The interaction controller may control movement of the hand model, and the hand model may trigger the role obtaining instruction. The virtual role may be determined from the VR scene according to requirements of the role obtaining instruction. For example, the role obtaining instruction carries a role name and a role identifier that are selected by the player in a role drop-down menu, and then the virtual role to be displayed in the VR scene may be determined according to the role name and the role identifier. In addition, file information required by the player may further be input according to parameter information carried by the role obtaining instruction, and the virtual role to be displayed in the VR scene may be determined using the file information.

It should be noted that in the embodiment of the present application, the role model selected in the VR scene may not appear in the VR scene, and a camera lens mounted on the role model is a viewing angle in which the user wears a VR display to watch the VR scene. The camera lens also needs to constantly move with the movement of the hand model, so that the user experiences movement of the role model during the movement of the hand model.

In some embodiments of the present application, the foregoing step 101 of obtaining a role obtaining instruction triggered by a hand model in the VR scene includes:

A1. detecting a to-be-sung song selected by the hand model in the VR scene, and adding the to-be-sung song to a list of songs; and A2. determining the role obtaining instruction according to a selection operation of the hand model.

The VR scene may be a role simulation scene of a vocal concert. The player may operate the interaction controller and control the hand model to select a to-be-sung song using the interaction controller. The to-be-sung song may be one or more songs. The player adds the to-be-sung song to the list of songs after selecting the to-be-sung song. It may be determined, based on the expanded list of songs, that a new to-be-sung song is added to the list. In this case, it may be determined, according to the selection operation of a song by the hand model, that the player issues the role obtaining instruction.

Further, in an implementation scene of performing the foregoing step A1 and step A2, step 102 of determining the virtual role from the VR scene according to the role obtaining instruction includes:

B1. determining a singing order of the virtual role according to the list of songs; and B2. determining that a current role state of the virtual role is a singer role, and activating a microphone in a case that it is the turn of the virtual role to sing a song according to the singing order; or B3. determining that a current role state of the virtual role is an audience role in a case that it is not the turn of the virtual role to sing a song according to the singing order.

A plurality of players may enter a same VR scene, and the plurality of players may implement virtual interaction in the VR scene. Each player may see the list of songs in the VR scene, for example, see the list of songs on a screen of the VR display. The list of songs includes to-be-sung songs requested by each of the plurality of players, and then a singing order in the list of songs may be determined based on a song request time or a priority of the virtual roles. For example, when a region to which a star role played by the virtual role belongs is consistent with a region to which a list of to-be-sung songs belongs, the virtual role has a high priority, and thus can be ranked in the forefront of the singing order. The singing order is a role state switching basis of the plurality of virtual roles. The current role state of a virtual role is determined to be a singer role and the microphone is activated if it is the turn of the virtual role to sing a song according to the singing order. The current role state of the virtual role is determined to be an audience role if it is not the turn of the virtual role to sing a song according to the singing order. For example, the player may operate a terminal apparatus, such as a VR client. Each player sees a virtual scene of a vocal concert after entering a room through an application program interface of the terminal apparatus, and a hand model is loaded in the virtual scene of the vocal concert. Therefore, the player may operate the hand model to explore freely in a position of an auditorium and trigger a song request operation through the hand model, thereby calling out a menu for song request. In a case that it is the turn of the virtual role operated by the player in the list of songs, the microphone of the terminal apparatus is activated, and the terminal apparatus automatically sends a virtual role of a last singer to the auditorium. In this case, a role state of the virtual role of the last layer is an audience role. Next, the terminal apparatus sends the virtual role of the current player to a stage for performance, and a current role state of the virtual role is a singer role.

In some embodiments of the present application, in addition to the foregoing steps performed in the embodiment of the present application, a method provided in the embodiment of the present application may further be used to perform the following scenes to generate a music file. In particular, the method further includes the following steps:

C1. obtaining an accompaniment file and a lyric file of a to-be-sung song from a song database;

C2. collecting, through the microphone, a sound file sung by the singer role; and C3. determining, according to the accompaniment file, the lyric file, and the sound file, a music file played in the VR scene.

The VR scene may be a role simulation scene of the vocal concert, and accompaniment files and lyric files of a plurality of songs may be stored in the song database. When determining a song to sing, the player may obtain the accompaniment file and the lyric file of the to-be-sung song from the song database, collect, through the microphone, the sound file sung by the singer role, and then determine, according to the accompaniment file, the lyric file, and the music file, the music file to be played in the VR scene. For example, it may be identified whether the current singer is singing. If the singer is singing, a sound state of the singer role is collected to get a sound file, and if the current singer is not singing, an accompaniment file and a lyric file may be collected.

Step 103: Virtual props in the VR scene are dynamically adjusted according to a music file played in the VR scene.

In the embodiment of the present application, in order to meet the requirement of the player for the sense of immersion in the VR scene, the virtual props in the VR scene may be dynamically adjusted according to the music file played in the VR scene. The dynamic adjustment may be real-time adjustment according to a play progress state of the music file played in the VR scene on a preset play order time axis. For example, dynamically adjusting the VR props in the VR scene may be dynamically adjusting the virtual props, or dynamically adjusting all parameters of the virtual props, such as a color display parameter, a direction orientation parameter, and a vibration frequency parameter, etc. In the embodiment of the present application, the virtual props in the VR scene are dynamically adjusted according to the music file played in the VR scene, so that the virtual props in the VR scene can be dynamically adjusted. When hearing the music file played in the VR scene, the player observes dynamic adjustment of the virtual props with the music file through eyes, thereby bringing a stronger sense of immersion to the user.

It should be noted that the music file played in the VR scene in the embodiment of the present application may be a music file input by the player, or may be a system self-configuration music file in the VR scene, or a music file collected by the player in real time, which is not limited herein. The music file played in the VR scene may be a piece of music information with notes, or a piece of music data with only a melody, or a piece of continuous voice data collected from the player, etc., which is not limited herein.

In the embodiment of the present application, there may be a plurality of virtual props in the VR scene. For example, the virtual props may be scene props in the VR scene, that is, props for decorating a scene and assisting the scene, and the virtual props may also be interactive props for a plurality of players to interact in a same VR scene. The VR scene being a role simulation scene of a vocal concert is used as an example. For example, the scene props may be a stage, lights, and a balloon, etc. displayed in the VR scene, and the interactive props may be a light stick, a sand hammer, gongs and drums, etc. operated by the hand model.

In some embodiments of the present application, step 103 of dynamically adjusting the virtual props in the VR scene according to the music file played in the VR scene includes:

D1. determining a global magnification parameter according to a music rhythm of the music file; and D2. dynamically adjusting virtual props in the VR scene using the global magnification parameter.

After the music file played in the VR scene is obtained, the music file is parsed to determine a music rhythm of the music file with the music rhythm as a reference, so that the global magnification parameter may be generated. For example, a beat per minute (BPM) of each song may be obtained through the music file. After the BPM is read, the global magnification parameter is determined according to the BPM of the music file, and then a dynamic adjustment period of the virtual props is calculated through numerical conversion. The global magnification parameter is used to indicate a play progress state of the music file played in the VR scene on the preset play order time axis. The global magnification parameter may be obtained through a globally maintained static pointer, and the virtual props in the VR scene may be dynamically adjusted through the global magnification parameter. For example, in order to ensure global unity, a global magnification parameter is added to a game state. The global magnification parameter may be used to control the virtual props. The player seems to enter a brand new world after wearing a VR display and an earphone, and scenery seen by eyes match a sound heard by ears, so that senses of sight and hearing are satisfied to a great extent, providing the player with a strong sense of immersion. In the embodiment of the present application, the global magnification parameter may be used to control the virtual props, so that adding and running of the virtual props can be dynamically controlled, facilitating setting of the virtual props in the virtual scene.

In some embodiments of the present application, step D2 of dynamically adjusting the virtual props in the VR scene using the global magnification parameter includes:

passing the global magnification parameter into a loop playback time axis; and setting a props attribute parameter of the virtual props according to a playback period of the loop playback time axis.

The global magnification parameter may represent a play progress state of the music file played in the VR scene on a preset playback order time axis. The global magnification parameter may be obtained through a globally maintained static pointer, and a props attribute parameter of the virtual props in the VR scene may be easily controlled through the global magnification parameter. The props attribute parameter may include a movement parameter or a material of the props. The global magnification parameter is passed into a time axis that is cyclically played, and then a playback period of the time axis may be set to coincide with the props attribute parameter, thereby achieving a dynamic environment effect full of rhythm. For example, the virtual props may be specifically interactive props in the VR scene, and a generating number and a generating frequency of the interactive props may be controlled using the global magnification parameter, for example, a number of bubbles and a generating frequency of bubbles in the VR scene is controlled.

Further, in some embodiments of the present application, the virtual props include scene props in the VR scene. In such an implementation scene, step D2 of dynamically adjusting the virtual props in the VR scene using the global magnification parameter includes:

D21: performing a multiplication operation on an original mask texture map using the global magnification parameter to get a dynamic mask texture map; and D22: performing a multiplication operation on the dynamic mask texture map and an original color texture map of the scene props to get an actual color texture map of the scene props.

The scene props need to be displayed in the VR scene. The scene props may be displayed in a manner of texture mapping. For example, the original mask texture map and the original color texture map are respectively configured for the scene props, and the original mask texture map and the original color texture map may be represented by UV coordinates of a specific pixel. The original color texture map may provide a global color of the scene props. For example, the original color texture map may contain a texture map of a plurality of colors. The original mask texture map may provide partial mask color processing of for the scene props, for example, the original mask texture map may be a black-and-white texture map. First, a multiplication operation is performed on the original mask texture map according to the global magnification parameter to obtain a dynamic mask texture map. The dynamic mask texture map may change local texture according to the global magnification parameter. After the dynamic mask texture map is obtained, the multiplication operation is performed on the dynamic mask texture map and the original color texture map of the scene props to obtain the actual color texture map of the scene props. The actual color may be finally displayed on the actual color texture map in the VR scene. The scene props may be enabled to display different colors in the VR scene through superimposing the dynamic mask texture map on the original color texture map. However, the dynamic mask texture map is obtained through processing the original mask texture maps using the global magnification parameter, so that the actual color texture map of the scene props may be dynamically adjusted. For example, a texture map may be rendered using the latest version UE4 of the Unreal Engine. The engine provides game developers with powerful functions such as graphics rendering, physical collisions, and resource management. In the embodiment of the present application, a mask of the texture map may be used to control a display mode of a dynamic material.

104. A virtual role in the VR scene is displayed through a VR display, and virtual props that are dynamically adjusted are displayed.

In the embodiment of the present application, the VR display is a display apparatus produced by a VR apparatus manufacturer. For example, the VR display may be an HTC VIVE, which is a virtual reality head-mounted display jointly developed by HTC and Valve.

In the embodiment of the present application, after the virtual role to be displayed in the VR scene is determined through the foregoing step 102, and after the virtual props to be displayed in the VR scene are dynamically adjusted through the foregoing step 103, the virtual role in the VR scene may be displayed to the player through the VR display. In addition, during displaying of the virtual role, the virtual props that are dynamically adjusted are displayed through the VR display. It may be learned from step 103 that such virtual props may be dynamically adjusted according to the music file played in the VR scene, so that the virtual props may be dynamically displayed according to the music file through the VR display.

In some embodiments of the present application, it may be learned from the foregoing examples that the virtual props may specifically include interactive props in the VR scene. In such an implementation scene, step 104 of displaying the virtual props that are dynamically adjusted includes:

E1. controlling movement of the interactive props in the VR scene through movement of the interaction controller;

E2. collecting movement information of the interactive props, the movement information including at least one of the following information: a speed, an angular velocity, an acceleration, and an angular acceleration; and E3. controlling according to the movement information, the interactive props to make a sound or not to make a sound in the VR scene.

If the virtual props are specifically interactive props in the VR scene, the player may control movement of the interactive props through the interactive controller. For example, a sensor is disposed on the interaction controller. Movement information of the interaction controller may be collected as the movement information of the interactive props. The movement information includes at least one of the following information: a speed, an angular velocity, an acceleration, and an angular acceleration. Finally, the interactive props may be controlled, according to the movement information, to make a sound or not to make a sound in the VR scene. Controlling a sound to be made or not to be made needs to be determined according to the movement information of the interactive props, which can be implemented using a plurality of policies. For example, it may be determined, according to a speed value, whether to make a sound or what kind of sound is made, or it may be determined, according to a value range of an angular velocity, whether to make a sound, or the foregoing kind of movement information may be combined with each other and jointly used to determine whether to make a sound. For example, a VR scene being a role interaction scene of a vocal concert is used as an example. The interactive props may be sand hammers or gongs and drums used by a singer role. Accompaniment of the gongs and drums is used as an example. A key problem to be resolved for the accompaniment of the gongs and drums is matching between actions and sounds, and a collision is simulated completely through four variables such as the speed, the angular velocity, the acceleration, and the angular acceleration.

In some embodiments of the present application, step E3 of controlling, according to the movement information, the interactive props to make a sound or not to make a sound in the VR scene includes:

on the basis of a preset sounding determining condition, the sounding determining condition including at least one of the following threshold conditions: a speed threshold condition, an angular velocity threshold condition, an acceleration threshold condition, and an angular acceleration threshold condition;

on the basis of whether the movement information meets the sounding determining condition;

controlling the interactive props to make a sound in the VR scene in a case that the movement information meets the sounding determining condition; or controlling the interactive props not to make a sound in the VR scene in a case that the movement information does not meet the sounding determining condition.

A corresponding threshold condition may be respectively set depending on different movement parameters of the interactive props, and it is determined whether to make a sound on the basis of whether different movement parameters meet the corresponding threshold condition. For example, at least one of the following steps may be performed, including: determining whether a speed of the interactive props meets the speed threshold condition, determining whether an acceleration of the interactive props meets the acceleration threshold condition, determining whether an angular velocity of the interactive props meets the angular velocity threshold condition, and determining whether an angular acceleration of the interactive props meets the angular acceleration threshold condition. It may be understood that whether at least one of the foregoing threshold conditions is met or not, it may be used to determine whether the interactive props are triggered to make a sound. For example, a state machine may be introduced to control the gong and drum to make a sound. When a speed of the gong and drum in high-speed movement is reduced below a certain threshold, and an acceleration exceeds a certain acceleration threshold, the gong and drum make sounds once.

In some embodiments of the present application, it may be learned from the foregoing examples that the virtual props may specifically include interactive props in the VR scene. In such an implementation scene, step 104 of displaying the virtual props that are dynamically adjusted includes:

F1. controlling movement of the interactive props in the VR scene through movement of the interaction controller;

F2. pre-determining whether the interactive props collide with the other virtual props in the VR scene; and F3. obtaining collision effect information according to a preset amount of advance, and playing a collision sound according to the collision effect information in a case of pre-determining that the interactive props collide with the other virtual props.

It may be the other virtual props that collide with the interactive props. The other virtual props may be operated by the player through a hand model. The other virtual props may hit and collide with the interactive props. The collision sound may be played using collision effect information when the collision succeeds, and a specific collision sound may be flexibly configured according to a scene.

Further, in some embodiments of the present application, in addition to including the foregoing step F1 to step F3, step 104 of displaying the virtual props that are dynamically adjusted, may further include:

F4. sending a vibration feedback message of a collision success through the interaction controller after the collision effect information is displayed.

The player touches and grabs the interactive props through the hand model. After the collision succeeds, feedback of the collision success may be given to the player through a mechanical vibration of a built-in motor of the interaction controller, so that the player can determine, through the vibration of the interactive controller, that the hand model has grabbed the interactive props, and may move the interaction props.

In the foregoing embodiments of the present application, if the virtual props are specifically the interactive props in the VR scene, the player may control movement of the interactive props through the interaction controller. A VR scene being a role interaction scene of a vocal concert is used as an example. The interactive props may be a light stick and the like used by an audience role. In a mini game using the light stick for support, the global magnification parameter may be used to control a number of bubbles and a frequency of bubbles. Adjustment of a hand feeling is the toughest problem. In order to get a good sense of hitting, an appropriate triggering effect, a sound effect, and vibration feedback of the handle need to be added. If the player's operation is inconsistent with performance, discomfort will be caused. Therefore, a collision time point used to trigger the effect is very important. However, bubbles also have some irregular changes due to the Fresnel effect when the bubbles are getting bigger. Therefore, in the embodiment of the present application, the hand feeling of hitting can be ensured in a method of dynamic collision. Because edges of the bubbles are unstable, determining of any hit of the light stick may cause an amount of advance in time. In a case of pre-determining that the collision of the interactive props is hit, collision effect information is obtained according to the preset amount of advance, and the collision sound is played according to the collision effect information.

It may be learned from the examples in the foregoing embodiments of the present application that, in the embodiment of the present application, a role obtaining instruction triggered by the hand model in the VR scene is first obtained, movement of the hand model in the VR scene being controlled by the interaction controller. Afterwards, the virtual role is determined from the VR scene according to the role obtaining instruction. Next, virtual props in the VR scene are dynamically adjusted according to the music file played in the VR scene. Finally, the virtual role in the VR scene is displayed through the VR display, and the virtual props that are dynamically adjusted are displayed. In the embodiment of the present application, the virtual props in the VR scene are dynamically adjusted according to the music file played in the VR scene, so that the virtual props in the VR scene can be dynamically adjusted. When the player hears the music file played in the VR scene, the player observes dynamic adjustment of the virtual props with the music file through eyes, thereby bringing a stronger sense of immersion to the user.

For better understanding and implementation of the foregoing solutions of the embodiments of the present application, specific descriptions are provided below by using examples of corresponding application scenarios.

Figure 2:
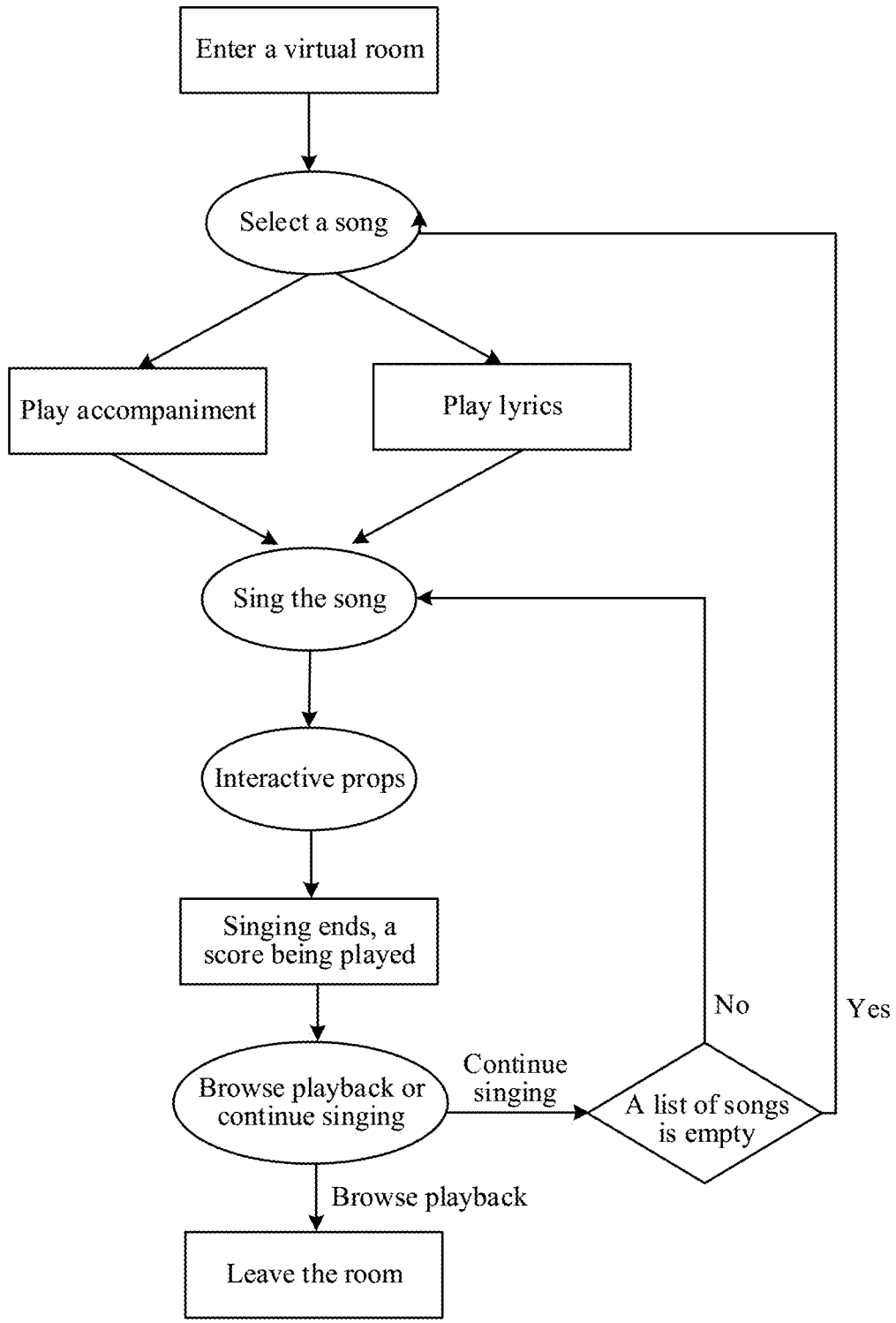
FIG. 2 is a process flowchart of singing a song by a singer role in a virtual vocal concert scene according to an embodiment of the present application.

Referring to FIG. 2, FIG. 2 is a process flowchart of singing a song by a singer role in a virtual vocal concert scene according to an embodiment of the present application. A VR scene being specifically a role interaction scene of a virtual vocal concert is used as an example. The virtual vocal concert may be understood as a virtual three-dimensional (3D) scene, which is a combination of realistic models built by a stage of the virtual vocal concert, an auditorium, and other articles. The virtual role in the virtual vocal concert scene may be Avatar, which is widely applied to a 3D game and virtual reality.

In the embodiment of the present application, a brand-new social experience is proposed. A vocal concert is simulated in VR, and each player has an Avatar to play the role of a superstar to enjoy singing in the spotlight, or may play the role of a small fan to intimately interact with an idol in the heart. The virtual scene changes according to a current music rhythm and singing of the singer to provide the player with a strong sense of substitution and immersion.

In the prior art, a jukebox cannot provide the player with very good singing experience without an immersive virtual stage and without interaction with other persons or feedback from other persons. In the embodiment of the present application, because VR experience and an operation mode are introduced, the player is endowed with great freedom and an incomparably strong sense of immersion compared to a common Karaoke game. Interactive articles are of great fun and can attract the player to actively participate in a game. In addition, there are a great many of personalized plans sufficiently meeting requirements of the player for customized clothes, scenes, motions, and even a sound template.

FIG. 2 shows a processing flow in which a singer role sings a song in a virtual vocal concert scene, mainly including the following steps.

(1) A player operates a hand model to enter a virtual room.
(2) The player operates the hand model to select a song.
(3) A terminal apparatus plays accompaniment.
(4) The terminal apparatus plays lyrics.
(5) A singer role sings a song.
(6) Props are used for interaction with other players.
(7) Singing ends, and a score is announced.
(8) The player operates the hand model to browse playback or continues singing.
(9) If selecting to continuously sing, the player needs to determine whether a list of songs is empty, if yes, step (2) is triggered, reselect a song, and if not, step (5) of singing a song is re-triggered.
(10) If browsing playback is selected, the player may leave the room.

The player sees a virtual vocal concert scene after entering the room, freely explores at the auditorium, and calls out a menu to request a song. When it is the player's turn in the list of songs, a microphone is activated, a virtual role is passed to a stage to start performance, and a last signer is automatically passed to the auditorium.

Interactive props refer to props for the singer to interact with the audience, including performance costumes and articles in the scene. The player may freely switch the performance costumes of the virtual role, select a scene, simply change some articles in the scene, and may further select a dance and an interactive motion (the interactive motion referring to a motion used by a singer for interacting with the audience) of the virtual role, meeting personalized demands of the player to the greatest extent.

Figure 3:
FIG. 3 is a schematic diagram of a Karaoke scene in a virtual vocal concert scene according to an embodiment of the present application.

FIG. 3 is a schematic diagram of a Karaoke scene in a virtual vocal concert scene according to an embodiment of the present application. Each player uses one virtual role, for example, there are three virtual roles in total in FIG. 3, which are respectively named as Kreiner, Jarad, and Caputto. There is a plurality of scene props in the virtual vocal concert scene, such as a virtual stage, a virtual light, etc. It should be noted that in the embodiment of the present application, FIG. 3 illustrates a black-and-white figure for description. It is not limited that respective colors of each virtual role and virtual scene may be further configured according to scene demands. With respect to a karaoke scene in the virtual vocal concert scene, there are abundant multi-person interaction ways. A main stage, the auditorium, and the lights are abundantly presented for interacting with the singer. Props used by the players to interact include light sticks, sand hammers, microphones, and so on. At any moment, there is only one singer on the stage. However, all virtual roles may become singers by requesting songs, and the singing order is determined according to a current list of songs.

Figure 4:
FIG. 4 is a schematic diagram of interaction between a lyric screen, stage lights, auditorium performance, and a singer role according to an embodiment of the present application.

FIG. 4 is a schematic diagram of interaction of a lyrics screen, stage lights, and the auditorium performance with a singer role according to an embodiment of the present application. If the virtual role of the player is the singer role, the player may see a microphone and a displayed lyrics screen, and the player may see the audience off the stage holding light sticks, thereby providing the player with a sense of immersion. After the audience picks up the light sticks when the light sticks are passed near a light stick shelf, bubbles appear in front of the audience, and the player may hit the bubble with the light sticks. Such bubbles appear according to a current song rhythm. For example, a beat per minute (BPM) of each song is obtained, the BPM is read into a program, and then an interval between appearing of bubbles is calculated through numerical conversion. In addition, such bubbles are invisible to the singer. Therefore, a picture the singer sees is that the audience off the stage waves the light sticks according to a rhythm to support the singer, and the audience can also experience the pleasure of hitting the bubbles in VR.

In order to achieve the expressive force of excellent VR vocal concert graphics, in the embodiment of the present application, a built-in UE4 framework is used to write a shader, and a multi-threaded rendering feature of an engine (that is, a game engine, in other words, the Unreal Engine) can be used to take both the effect and efficiency into account. In addition, the embodiment of the present application is intended to achieve integration of presentation of an entire stage with a rhythm of the background music. Music of the song piece and voice of the singer need to be analyzed. First, data is extracted from a central processing unit (CPU), the data being sample data of the player's microphone. Afterwards, the data is transmitted into a graphics processing unit (GPU) for rendering. In order to ensure global unity, in an embodiment of the present application, a global magnification parameter is added to a game state. The game state may be obtained through a globally maintained static pointer. The global magnification parameter may be used to control these dynamic materials in the GPU. The player seems to enter a brand new world after wearing an HTC VIVE and an earphone, and scenery seen by eyes is matched with a sound heard by ears, so that a sense of sight and hearing is satisfied to a great extent.

Figure 5:
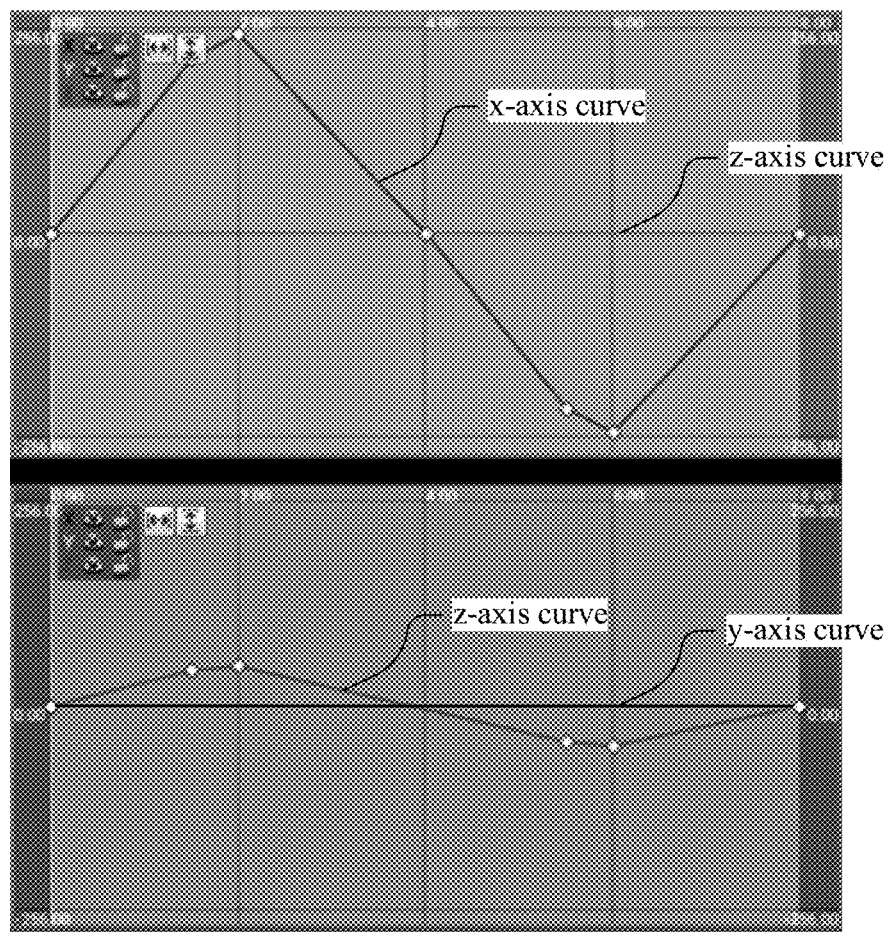
FIG. 5 is an interface diagram of a time axis for controlling light movement and flicker according to an embodiment of the present application.

FIG. 5 is an interface diagram of a time axis for controlling light motion and flicker according to an embodiment of the present application. The time axis for controlling the light motion and flicker in FIG. 5 refers to flicker of the lights, the lights being turned on and off at a fixed frequency, or light intensity changing. UE4 is a tool for controlling variable values through time variation. A three-dimensional vector (x, y, z) is controlled herein, x, y, and z respectively corresponding to values represented by red, green, and blue. The three-dimensional vector represents a motion parameter of light. An upper part in FIG. 5 may control a position of the light by adjusting an x-axis curve and a z-axis curve. A lower part in FIG. 5 may control rotation of the light by adjusting a y-axis curve and a z-axis curve.

In the embodiment of the present application, some customized time axes are designed. FIG. 5 may be an interface diagram of a time axis of the UE4 engine. As shown in FIG. 5, a motion parameter or a material parameter of an article in a scene may be easily controlled, and the global magnification parameter is transmitted into a time axis that is cyclically played, so that a playback period of the time axis ma coincide with a props attribute parameter, and a dynamic environment effect full of rhythm is obtained.

In the embodiment of the present application, most dynamic materials are implemented through texture offset. In the virtual scene of the vocal concert, almost all models are rendered using a Surface Shader. The Surface Shader is a UE4-packaged physics-based shader, and can achieve a customized effect in a material editor. Physics-based coloring is a rendering manner for highlighting a sense of reality in computer graphics and is widely used in today's high-quality games. A basic principle of the physics-based coloring is to introduce a micro-surface model to approximately calculate reflection of illumination on a micro surface, thereby simulating data such as roughness, transparency, and the like of an object, the most critical information being normal distribution. Each model has UV coordinates in a one-to-one mapping with texture color values. The UV coordinates are used to sample a two-dimensional vector of the texture map color value in graphics rendering. Eventually, the color values obtained from these samples can determine an effect of rendering a target on the screen. A rendering algorithm requires sampling texture data.

In order to effectively obtain an effect of dynamic lighting, in the embodiment of the present application, these color values need to be changed, and the original texture map needs to be reconstructed at root. In the embodiment of the present application, a mask is generally introduced into the shader to control these maps. In order to match the music rhythm in real time, a method for creating a dynamic mask is implemented in the embodiment of the present application, which may very simply and effectively achieve all customized texture offset effects on the stage. FIG. 6 is a process flowchart of a dynamic mask according to an embodiment of the present application. A multiplication operation is performed on an original mask texture map using the global magnification parameter to get a dynamic mask texture map. A multiplication operation is performed on the dynamic mask texture map and an original color texture map of the scene props to get an actual color texture map of the scene props.

Materials of the scene props achieve an effect that the stage lights in the virtual vocal concert scene are illuminated one by one with high spirits. In the embodiment of the present application, it may be identified whether a current singer is singing. If yes, the emotion may represent a sound state of the singer. If not, the emotion may represent accompaniment. The original color texture map is original data given by arts, and is a complete model with a map. The model is lit by lights, and the UV coordinates of the model are constant. Therefore, in order to achieve a neon light effect that some lights go on and the other lights are dimmed, it is necessary to make the color values corresponding to the dimmed light UV return to zero, and a masking operation can be completed by multiplying the texture samples. A half-black and half-white original texture is provided. In the embodiment of the present application, a mask of any portion may be skillfully calculated. For example, a UV offset is controlled using a percentage parameter, a dynamic mask texture map is dynamically obtained, and then the dynamic mask texture map is multiplied by the original color texture map to get a corresponding actual texture. Assuming that an offset is B, and a percentage is p, B=(u−p)/2, u being a u coordinate.

Interaction of the virtual roles is mainly implemented through two mini-games such as sand hammer accompaniment and bubble hitting using light sticks. The player may operate through a VR handle such as an Oculus Touch or a Vive Controller, and most of the interaction is also completed using the handle. In the embodiment of the present application, complete input mapping abstraction is established through an input control system in the UE4, thereby ensuring unity of a plurality of platforms. In a VR scene, a game handle held by the player is mapped to two virtual hands, and positions and orientations of the two virtual hands in the virtual space are also captured by a sensor and drawn on a head-mounted display screen in real time. The most important function of the pair of virtual hands is to grab articles and control the articles through gestures and buttons. FIG. 7-*a* and FIG. 8-*a* show that sand hammers and light sticks are main carriers for interaction of a singer with the audience.

First, the sand hammer interaction in FIG. 7-*a* is illustrated. As shown in FIG. 7-*b*, a key problem to be resolved for sand hammer accompaniment is matching between a motion and a sound. Actually, a reason why the sand hammer can make a sound is sand inside an article collides with an inner wall. If internal particle motion is to be completely simulated in real time, these overheads cannot be afforded by a lightweight game in the embodiment of the present application. Therefore, in the embodiment of the present application, the UE4 built-in physics-based engine is abandoned, a set of lightweight collision sounding methods are redesigned, and collision is simulated completely using four variables such as a speed, an angular velocity, an acceleration, and an angular acceleration. In the embodiment of the present application, a state machine is introduced to control sounding of the sand hammer. As shown in FIG. 7-*b*, the sounding state machine of the sand hammer has a plurality of states: high-speed motion, highly-accelerated motion, motionless or low-speed motion. These motion states may be freely switched. For example, when a speed of a sand hammer in high-speed motion is reduced below a certain threshold with a relatively great acceleration, the sand hammer makes a sound once. The angular velocity and the angular acceleration are calculated in a similar way but are calculated separately from the speed and the acceleration, and then superimposed to be jointly used to control sounding of the sand hammer.

As shown in FIG. 8-*b*, in a mini-game using a light stick for support, the foregoing global magnification parameter is used to control a number of bubbles and bubbling frequency in the embodiment of the present application. Adjustment of a hand feeling is the toughest problem. In order to get a good sense of hitting, an appropriate special triggering effect, a sound effect, and vibration feedback of the handle needs to be added. If the player's operation is inconsistent with performance, discomfort will be caused. Therefore, a collision time point used to trigger the effects is very important. However, bubbles also have some irregular changes due to the Fresnel effect when the bubbles are getting bigger. Therefore, in the embodiment of the present application, a method of dynamic collision is designed to ensure the hand feeling of waving. Because edges of the bubbles are unstable, an amount of advance in time exists for determining of any hit of the light stick. A material of the bubble is implemented by Fresnel reflection, and a size of the bubbles is visually unstable. Bubble hitting by the player is determined through collision detection. A hand feeling for the player to hit a bubble is inconsistent with actual performance if there is no amount of advance. After the collision hit is pre-determined, a special effect is called. After the special effect is continuously played, callback destruction may be executed. Finally, this hit is updated to a hit rate when the hit rate is counted, and an existing hit rate is increased by 1. The callback destruction means that a time for which the player hits the bubble or the bubble exists exceeds a preset life cycle, and the callback destruction is notified to execute a destruction process of the bubbles.

According to the performance and interaction solutions proposed in the embodiments of the present application, a problem of simulating a vocal concert in VR is resolved, so that the player can be made close to others through VR social contact when enjoying an audio-visual feast. A user simulates a singer, and the other user simulates an audience, so that both of them interact with each other and are made close to the other.

It should be noted that, for simple description, the foregoing method embodiments are represented as a series of actions, but a person skilled in the art should appreciate that the present disclosure is not limited to the described order of the actions because some steps may be performed in another order or performed simultaneously according to the present disclosure. In addition, a person skilled in the art should also know that all the embodiments described in this specification are exemplary embodiments, and the related actions and modules are not necessarily required in the present disclosure.

In order to better implement the foregoing solutions of the embodiments of the present application, related devices for implementing the foregoing solutions are also provided below.

Referring to FIG. 9-*a*, a terminal apparatus 900 provided in an embodiment of the present application may include: an obtaining module 901, a role determining module 902, a props adjusting module 903, and a display module 904.

The obtaining module 901 is configured to obtain a role obtaining instruction triggered by a hand model in a VR scene, movement of the hand model in the VR scene being controlled by an interaction controller.

The role determining module 902 is configured to determine a virtual role from the VR scene according to the role obtaining instruction.

The props adjusting module 903 is configured to dynamically adjust virtual props in the VR scene according to a music file played in the VR scene.

The display module 904 is configured to display the virtual role in the VR scene through a VR display and display the virtual props that are dynamically adjusted.

In some embodiments of the present application, the obtaining module 901 is specifically configured to: detect a to-be-sung song that is selected by the hand model in the VR scene, and add the to-be-sung song to a list of songs; and determine the role obtaining instruction according to a selection operation of the hand model.

Further, in some embodiments of the present application, the role determining module 902 is specifically configured to: determine a singing order of the virtual role according to the list of songs; determine that a current role state of the virtual role is a singer role, and activate a microphone in a case that it is the turn of the virtual role to sing a song according to the singing order; and determine that the current role state of the virtual role is an audience role in a case that it is not the turn of the virtual role to sing a song according to the singing order.

In some embodiments of the present application, referring to FIG. 9-*b*, the terminal apparatus 900 further includes a music file obtaining module 905 configured to: obtain an accompaniment file and a lyric file of a to-be-sung song from a song database; collect, through the microphone, a sound file sung by the singer role; and determine, according to the accompaniment file, the lyric file, and the sound file, a music file played in the VR scene.

In some embodiments of the present application, the props adjusting module 903 is specifically configured to determine a global magnification parameter according to a music rhythm of the music file; and dynamically adjust the virtual props in the VR scene using the global magnification parameter.

In some embodiments of the present application, the props adjusting module 903 is specifically configured to pass the global magnification parameter into a loop playback time axis; and set a props attribute parameter of the virtual props according to a play period of the loop playback time axis.

Further, in some embodiments of the present application, the virtual props include scene props in the VR scene.

The props adjusting module 903 is specifically configured to perform a multiplication operation on an original mask texture map using the global magnification parameter to get a dynamic mask texture map; and perform a multiplication operation on the dynamic mask texture map and an original color texture map of the scene props to get an actual color texture map of the scene props.

In some embodiments of the present application, the virtual props include interactive props in the VR scene.

The display module 904 is specifically configured to control movement of the interactive props in the VR scene through movement of the interaction controller; collect movement information of the interactive props, the movement information including at least one of the following information: a speed, an angular velocity, an acceleration, and an angular acceleration; and control, according to the movement information, the interactive props to make a sound or not to make a sound in the VR scene.

In some embodiments of the present application, the display module 904 is specifically configured to control, on the basis of a preset sounding determining condition, the sounding determining condition including at least one of the following threshold conditions: a speed threshold condition, an angular velocity threshold condition, an acceleration threshold condition, and an angular acceleration threshold condition; on the basis of whether the movement information meets the sounding determining condition, the interactive props to make a sound in the VR scene in a case that the movement information meets the sounding determining condition; and control the interactive props not to make a sound in the VR scene in a case that the movement information does not meet the sounding determining condition.

In some embodiments of the present application, the virtual props include interactive props in the VR scene.

The display module 904 is specifically configured to control movement of the interactive props in the VR scene through movement of the interaction controller; pre-determine whether the interactive props collide with the other virtual props in the VR scene; and obtain collision effect information according to a preset amount of advance, and display the collision effect information of the in a case of pre-determining that the interactive props collide with the other virtual props.

In some embodiments of the present application, the display module 904 is further configured to send a vibration feedback message of a collision success through the interaction controller after a collision sound is played according to the collision effect information.

It can be learned from the examples in the foregoing embodiments of the present application that, in the embodiments of the present application, the role obtaining instruction triggered by the hand model in the VR scene is first obtained, movement of the hand model in the VR scene being controlled by the interaction controller. Afterwards, the virtual role is determined from the VR scene according to the role obtaining instruction. Next, the virtual props in the VR scene are dynamically adjusted according to the music file played in the VR scene. Finally, the virtual role in the VR scene is displayed through the VR display, and the virtual props that are dynamically adjusted are displayed. The virtual props in the VR scene are dynamically adjusted according to the music file played in the VR scene in the embodiment of the present application, so that the virtual props in the VR scene can be dynamically adjusted. When hearing the music file played in the VR scene, the player observes dynamic adjustment of the virtual props with the music file through eyes, thereby bringing a stronger sense of immersion to the player.

It should be noted that, based on a same concept, technical effects brought by contents such as information interaction and an execution process between the modules/units of the foregoing device are the same as that in the method embodiments of the present application. For details, reference may be made to the description of the foregoing method embodiments of the present application, and details are not described herein again.

An embodiment of the present application further provides a computer storage medium, where the computer storage medium stores a program, and when the program is executed, a part or all of the steps recorded in the method embodiment are included.

Figure 10:
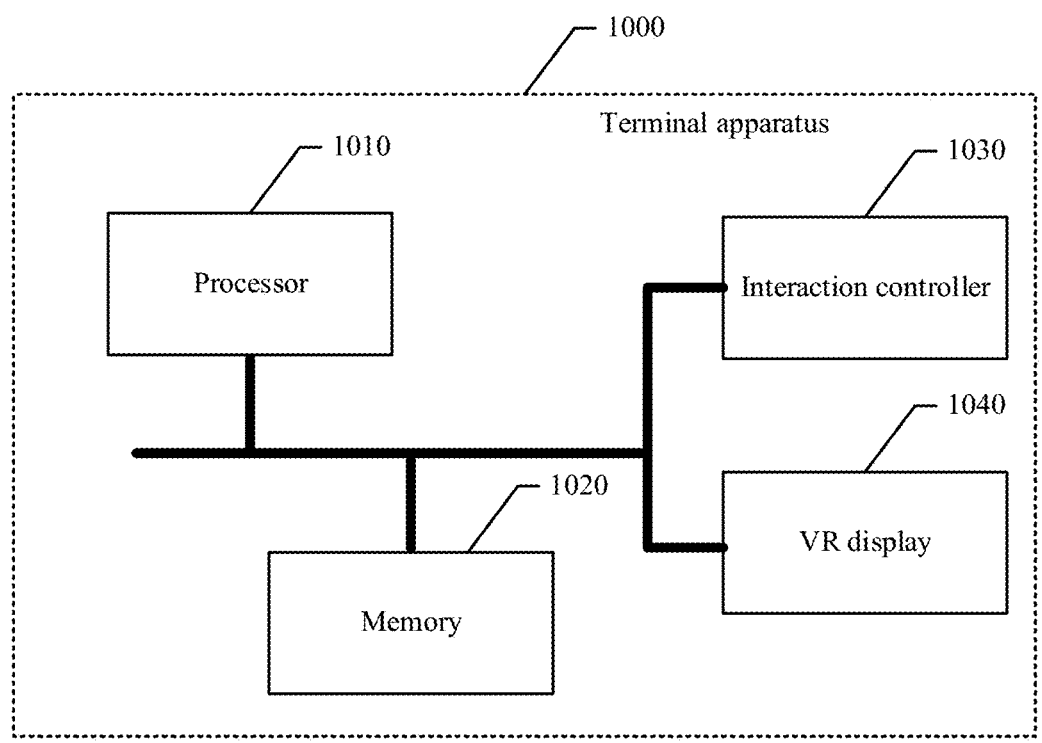
FIG. 10 is a schematic structural diagram of another terminal apparatus according to an embodiment of the present application.

An embodiment of the present application further provides a terminal device. As shown in FIG. 10, the terminal device 1000 includes: a processor 1010, a memory 1020, an interaction controller 1030, and a VR display 1040. The processor 1010 and the memory 1020 communicating with each other through a bus, and the processor 1010 communicating with the interaction controller 1030 and the VR display 1040 through a wireless network.

The interaction controller 1030 is configured to control movement of a hand model.

The memory 1020 is configured to store a program, an instruction, and data.

The processor 1010 is configured to perform the method in the foregoing method embodiment by invoking the program, the instruction, and the data in the memory.

The VR display 1040 is configured to display, under the control of the processor 1010, the virtual role in the VR scene and display the virtual props that are dynamically adjusted.

Specifically, the memory 1020 may be configured to store a software program and module. The processor 1010 runs the software program and module stored in the memory 1020, to perform various functional applications and data processing of the terminal device 1000. The memory 1020 may mainly include a program storage area and a data storage area. The program storage area may store an operating system, an application program required by at least one function (such as a sound playback function and an image display function), and the like. The data storage area may store data (such as audio data and an address book) created according to use of the terminal device, and the like. In addition, the memory 1020 may include a high speed random access memory, and may also include a non-volatile memory, such as at least one magnetic disk storage device, a flash memory, or another volatile solid-state storage device.

The processor 1010 is the control center of the terminal device 1000, and is connected to each part of the whole terminal device by using various interfaces and lines. By running or executing the software program and/or module stored in the memory 1020, and invoking data stored in the memory 1020, the processor 1010 performs various functions and data processing of the terminal device, thereby performing overall monitoring on the terminal device. Optionally, the processor 1010 may include one or more processing units. Preferably, the processor 1010 may integrate an application processor and a modem processor. The application processor mainly processes an operating system, a user interface, an application program, and the like. The modem processor mainly processes wireless communication. It may be understood that the foregoing modem may alternatively not be integrated into the processor 1010.

In this embodiment of the present application, the processor 1010 included in the terminal device 1000 further controls to perform the foregoing role simulation method in a VR scene performed by a terminal.

In addition, it should be noted that the described apparatus embodiment is merely exemplary. The units described as separate parts may or may not be physically separated, and parts displayed as units may or may not be physical units, may be located in one position, or may be distributed on a plurality of network units. Some or all modules thereof may be selected based on an actual requirement, to implement an objective of the solution in this embodiment. In addition, in the accompanying drawings of the apparatus embodiments provided by the present application, connection relationships between modules indicate that the modules have communication connections with each other, which may be specifically implemented as one or more communications buses or signal cables. A person of ordinary skill in the art may understand and implement the objective without creative efforts.

Based on the foregoing descriptions of the implementations, a person skilled in the art may clearly understand that the present disclosure may be implemented by software in addition to necessary universal hardware. Certainly, the present disclosure may alternatively be implemented by specific hardware including an application-specific integrated circuit, a dedicated CPU, a dedicated memory, a dedicated element, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. However, as for the present disclosure, software program implementation is a better implementation in most cases. Based on such an understanding, the technical solutions of the present disclosure essentially or the part contributing to the existing technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present application.

All or some of the foregoing embodiments may be implemented by using software, hardware, firmware, or any combination thereof. When software is used for implementation, implementation may be entirely or partially performed in the form of a computer program product.

The computer program product includes one or more computer instructions. When the computer program instructions are loaded and executed on a computer, all or some of the processes or functions according to the embodiments of the present application are produced. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, a computer, server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, including one or more usable media. The usable medium may be a magnetic medium (for example, a soft disk, a hard disk, or a magnetic tape), an optical medium (for example, a DVD), a semiconductor medium (for example, a solid state disk (Solid State Disk, SSD)), or the like.

What is claimed is:

1. A role simulation method in a virtual reality (VR) scene performed at a terminal apparatus having one or more processors and memory storing programs to be executed by the one or more processors, the method comprising:
   obtaining a role obtaining instruction triggered by a hand model in the VR scene, wherein a movement of the hand model in the VR scene is controlled by an interaction controller;
   determining a virtual role from the VR scene according to the role obtaining instruction;
   dynamically adjusting virtual props in the VR scene according to a music file played in the VR scene, including:
      determining a global magnification parameter according to a music rhythm of the music file; and
      dynamically adjusting the virtual props in the VR scene using the global magnification parameter; and
   displaying the virtual role in the VR scene through a VR display, and displaying the virtual props that are dynamically adjusted.

2. The method according to claim 1, wherein the obtaining a role obtaining instruction triggered by a hand model in the VR scene comprises:
   detecting a to-be-sung song that is selected by the hand model in the VR scene, and adding the to-be-sung song to a list of songs; and
   determining the role obtaining instruction according to a selection operation of the hand model.

3. The method according to claim 2, wherein the determining a virtual role from the VR scene according to the role obtaining instruction comprises:
   determining a singing order of the virtual role according to the list of songs; and
   determining that a current role state of the virtual role is a singer role, and activating a microphone in a case that it is the turn of the virtual role to sing a song according to the singing order; or determining that a current role state of the virtual role is an audience role in a case that it is not the turn of the virtual role to sing a song according to the singing order.

4. The method according to claim 3, wherein the method further comprises:
   obtaining an accompaniment file and a lyric file of a to-be-sung song from a song database;
   collecting a sound file sung by the singer role through the microphone; and
   determining, according to the accompaniment file, the lyric file, and the sound file, the music file played in the VR scene.

5. The method according to claim 1, wherein the dynamically adjusting the virtual props in the VR scene using the global magnification parameter comprises:
   passing the global magnification parameter into a loop playback time axis; and
   setting a props attribute parameter of the virtual props according to a playback period of the loop playback time axis.

6. The method according to claim 1, wherein the virtual props comprise scene props in the VR scene; and
   the dynamically adjusting the virtual props in the VR scene using the global magnification parameter comprises:
   performing a multiplication operation on an original mask texture map using the global magnification parameter to get a dynamic mask texture map; and
   performing a multiplication operation on the dynamic mask texture map and an original color texture map of the scene props to get an actual color texture map of the scene props.

7. The method according to claim 1, wherein the virtual props comprise interactive props in the VR scene; and
   the displaying the virtual props that are dynamically adjusted comprises:
   controlling movement of the interactive props in the VR scene through movement of the interaction controller;
   collecting movement information of the interactive props, the movement information comprising at least one of the following information: a speed, an angular velocity, an acceleration, and an angular acceleration; and
   controlling, according to the movement information, the interactive props to make a sound or not to make a sound in the VR scene.

8. The method according to claim 7, wherein the controlling, according to the movement information, the interactive props to make a sound or not to make a sound in the VR scene comprises:
   on the basis of a preset sounding determining condition, the sounding determining condition comprising at least one of the following threshold conditions: a speed threshold condition, an angular velocity threshold condition, an acceleration threshold condition, and an angular acceleration threshold condition;
   on the basis of whether the movement information meets the sounding determining condition;
   controlling the interactive props to make a sound in the VR scene in a case that the movement information meets the sounding determining condition; or
   controlling the interactive props not to make a sound in the VR scene in a case that the movement information does not meet the sounding determining condition.

9. The method according to claim 1, wherein the virtual props comprise interactive props in the VR scene; and
   the displaying the virtual props that are dynamically adjusted comprises:
   controlling movement of the interactive props in the VR scene through movement of the interaction controller;
   pre-determining whether the interactive props collide with other virtual props in the VR scene; and
   obtaining collision effect information according to a preset amount of advance, and playing a collision sound according to the collision effect information in a case of pre-determining that the interactive props collide with the other virtual props.

10. The method according to claim 9, wherein the displaying the virtual props that are dynamically adjusted further comprises:
    sending a vibration feedback message of a collision success through the interaction controller after the collision sound is played according to the collision effect information.

11. A terminal apparatus comprising one or more processors, memory coupled to the one or more processors and a plurality of programs for role simulation in a virtual reality (VR) scene stored in the memory that, when executed by the one or more processors, cause the mobile terminal to perform a plurality of operations comprising:
    obtaining a role obtaining instruction triggered by a hand model in the VR scene, wherein a movement of the hand model in the VR scene is controlled by an interaction controller;
    determining a virtual role from the VR scene according to the role obtaining instruction;
    dynamically adjusting virtual props in the VR scene according to a music file played in the VR scene, including:
       determining a global magnification parameter according to a music rhythm of the music file; and
       dynamically adjusting the virtual props in the VR scene using the global magnification parameter; and
    displaying the virtual role in the VR scene through a VR display, and displaying the virtual props that are dynamically adjusted.

12. The terminal apparatus according to claim 11, wherein the obtaining a role obtaining instruction triggered by a hand model in the VR scene comprises:
    detecting a to-be-sung song that is selected by the hand model in the VR scene, and adding the to-be-sung song to a list of songs; and
    determining the role obtaining instruction according to a selection operation of the hand model.

13. The terminal apparatus according to claim 12, wherein the determining a virtual role from the VR scene according to the role obtaining instruction comprises:
    determining a singing order of the virtual role according to the list of songs; and
    determining that a current role state of the virtual role is a singer role, and activating a microphone in a case that it is the turn of the virtual role to sing a song according to the singing order; or
    determining that a current role state of the virtual role is an audience role in a case that it is not the turn of the virtual role to sing a song according to the singing order.

14. The terminal apparatus according to claim 11, wherein the virtual props comprise interactive props in the VR scene; and
    the displaying the virtual props that are dynamically adjusted comprises:

controlling movement of the interactive props in the VR scene through movement of the interaction controller;

collecting movement information of the interactive props, the movement information comprising at least one of the following information: a speed, an angular velocity, an acceleration, and an angular acceleration; and controlling, according to the movement information, the interactive props to make a sound or not to make a sound in the VR scene.

15. The terminal apparatus according to claim 11, wherein the virtual props comprise interactive props in the VR scene; and the displaying the virtual props that are dynamically adjusted comprises:

controlling movement of the interactive props in the VR scene through movement of the interaction controller;

pre-determining whether the interactive props collide with other virtual props in the VR scene; and obtaining collision effect information according to a pre-set amount of advance, and playing a collision sound according to the collision effect information in a case of pre-determining that the interactive props collide with the other virtual props.

16. A non-transitory computer readable storage medium storing a plurality of machine readable instructions for role simulation in a virtual reality (VR) scene in connection with a terminal apparatus having one or more processors, wherein the plurality of machine readable instructions, when executed by the one or more processors, cause the terminal apparatus to perform a plurality of operations including:

obtaining a role obtaining instruction triggered by a hand model in the VR scene, wherein a movement of the hand model in the VR scene is controlled by an interaction controller;

determining a virtual role from the VR scene according to the role obtaining instruction;

dynamically adjusting virtual props in the VR scene according to a music file played in the VR scene, including:

determining a global magnification parameter according to a music rhythm of the music file; and dynamically adjusting the virtual props in the VR scene using the global magnification parameter; and displaying the virtual role in the VR scene through a VR display, and displaying the virtual props that are dynamically adjusted.

17. The non-transitory computer readable storage medium according to claim 16, wherein the obtaining a role obtaining instruction triggered by a hand model in the VR scene comprises:

detecting a to-be-sung song that is selected by the hand model in the VR scene, and adding the to-be-sung song to a list of songs; and determining the role obtaining instruction according to a selection operation of the hand model.

18. The non-transitory computer readable storage medium according to claim 17, wherein the determining a virtual role from the VR scene according to the role obtaining instruction comprises:

determining a singing order of the virtual role according to the list of songs; and determining that a current role state of the virtual role is a singer role, and activating a microphone in a case that it is the turn of the virtual role to sing a song according to the singing order; or determining that a current role state of the virtual role is an audience role in a case that it is not the turn of the virtual role to sing a song according to the singing order.

19. The non-transitory computer readable storage medium according to claim 16, wherein the virtual props comprise interactive props in the VR scene; and the displaying the virtual props that are dynamically adjusted comprises:

controlling movement of the interactive props in the VR scene through movement of the interaction controller;

collecting movement information of the interactive props, the movement information comprising at least one of the following information: a speed, an angular velocity, an acceleration, and an angular acceleration; and controlling, according to the movement information, the interactive props to make a sound or not to make a sound in the VR scene.

20. The non-transitory computer readable storage medium according to claim 16, wherein the virtual props comprise interactive props in the VR scene; and the displaying the virtual props that are dynamically adjusted comprises:

controlling movement of the interactive props in the VR scene through movement of the interaction controller;

pre-determining whether the interactive props collide with other virtual props in the VR scene; and obtaining collision effect information according to a pre-set amount of advance, and playing a collision sound according to the collision effect information in a case of pre-determining that the interactive props collide with the other virtual props.

* * * * *